(12) United States Patent
Trude

(10) Patent No.: US 7,799,264 B2
(45) Date of Patent: Sep. 21, 2010

(54) CONTAINER AND METHOD FOR BLOWMOLDING A BASE IN A PARTIAL VACUUM PRESSURE REDUCTION SETUP

(75) Inventor: Gregory Trude, Seven Valleys, PA (US)

(73) Assignee: Graham Packaging Company, L.P., York, PA (US)

(*) Notice: Subject to any disclaimer, the term of this patent is extended or adjusted under 35 U.S.C. 154(b) by 1225 days.

(21) Appl. No.: 11/375,040

(22) Filed: Mar. 15, 2006

(65) Prior Publication Data
US 2007/0215571 A1    Sep. 20, 2007

(51) Int. Cl.
*B29C 49/00* (2006.01)
(52) U.S. Cl. .................. 264/524; 264/500; 264/523
(58) Field of Classification Search .......... None
See application file for complete search history.

(56) References Cited

U.S. PATENT DOCUMENTS

| | | | |
|---|---|---|---|
| D110,624 S | 7/1938 | Mekeel, Jr. |
| 2,378,324 A | 6/1945 | Ray et al. |
| 2,960,248 A | 11/1960 | Kuhlman |
| 3,043,461 A | 7/1962 | Glassco |
| 3,397,724 A | 8/1968 | Bolen et al. |
| 3,409,167 A | 11/1968 | Blanchard |
| 3,468,443 A | 9/1969 | Marcus |
| 3,485,355 A | 12/1969 | Stewart |
| 3,704,140 A | 11/1972 | Petit et al. |
| 3,727,783 A | 4/1973 | Carmichael |
| 3,918,920 A | 11/1975 | Barber |
| 3,935,955 A | 2/1976 | Das |
| 3,941,237 A | 3/1976 | MacGregor, Jr. |
| 4,036,926 A | 7/1977 | Chang |
| 4,125,632 A | 11/1978 | Vosti et al. |
| 4,134,510 A | 1/1979 | Chang |
| 4,170,622 A | 10/1979 | Uhlig |
| 4,170,662 A | 10/1979 | Uhlig et al. |

(Continued)

FOREIGN PATENT DOCUMENTS

AU    2002257159 B2    4/2003

(Continued)

OTHER PUBLICATIONS

A certified copy of the file wrapper and contents of U.S. Appl. No. 60/220,326, filed Jul. 24, 2000 dated Oct. 29, 2008.

(Continued)

*Primary Examiner*—Monica A Huson
(74) *Attorney, Agent, or Firm*—Miles & Stockbridge P.C.; James T. Carmichael; Patrick L. Miller

(57) ABSTRACT

A base of a container may include a standing surface, a first wall, a second wall, a first hinge, and a second hinge. The first hinge may be positioned between the standing surface and the first wall, the first wall being rotateable about the first hinge relative to a longitudinal axis of the container. The second hinge may be positioned between the first wall and the second wall, the second wall being rotateable about the second hinge relative to the longitudinal axis of the container, where rigidity of the base prevents substantial net distortion of the base during rotation of the second wall.

18 Claims, 4 Drawing Sheets

U.S. PATENT DOCUMENTS

| | | | |
|---|---|---|---|
| 4,174,782 A | 11/1979 | Obsomer | |
| 4,231,483 A | 11/1980 | Dechenne et al. | |
| 4,301,933 A | 11/1981 | Yoshino et al. | |
| 4,318,489 A | 3/1982 | Snyder et al. | |
| 4,318,882 A | 3/1982 | Agrawal et al. | |
| 4,338,765 A | 7/1982 | Ohmori et al. | |
| 4,355,728 A | 10/1982 | Ota et al. | |
| 4,381,061 A | 4/1983 | Cerny et al. | |
| D269,158 S | 5/1983 | Gaunt | |
| 4,386,701 A | 6/1983 | Galer | |
| 4,436,216 A | 3/1984 | Chang | |
| 4,450,878 A | 5/1984 | Takada et al. | |
| 4,610,366 A | 9/1986 | Estes et al. | |
| 4,628,669 A | 12/1986 | Herron et al. | |
| 4,642,968 A | 2/1987 | McHenry et al. | |
| 4,667,454 A | 5/1987 | McHenry et al. | |
| 4,684,025 A | 8/1987 | Copland et al. | |
| D292,378 S | 10/1987 | Brandt et al. | |
| 4,773,458 A | 9/1988 | Touzani | |
| 4,785,949 A | 11/1988 | Krishnakumar et al. | |
| 4,785,950 A | 11/1988 | Miller et al. | |
| 4,807,424 A | 2/1989 | Robinson et al. | |
| 4,831,050 A | 5/1989 | Bettle | |
| 4,836,398 A | 6/1989 | Leftault, Jr. et al. | |
| 4,850,493 A | 7/1989 | Howard, Jr. | |
| 4,850,494 A | 7/1989 | Howard, Jr. | |
| 4,867,323 A | 9/1989 | Powers | |
| 4,880,129 A | 11/1989 | McHenry et al. | |
| 4,892,205 A | 1/1990 | Powers et al. | |
| 4,896,205 A | 1/1990 | Weber | |
| 4,967,538 A | 11/1990 | Leftault, Jr. et al. | |
| 4,997,692 A | 3/1991 | Yoshino | |
| 5,005,716 A | 4/1991 | Eberle | |
| 5,014,868 A | 5/1991 | Wittig et al. | |
| 5,024,340 A | 6/1991 | Alberghini et al. | |
| 5,060,453 A | 10/1991 | Alberghini et al. | |
| 5,067,622 A | 11/1991 | Garver et al. | |
| 5,090,180 A | 2/1992 | Sörensen | |
| 5,092,474 A | 3/1992 | Leigner | |
| 5,133,468 A | 7/1992 | Brunson et al. | |
| 5,217,737 A | 6/1993 | Gygax et al. | |
| 5,234,126 A | 8/1993 | Jonas et al. | |
| 5,244,106 A | 9/1993 | Takacs | |
| 5,251,424 A | 10/1993 | Zenger et al. | |
| 5,255,889 A | 10/1993 | Collette et al. | |
| 5,261,544 A | 11/1993 | Weaver, Jr. | |
| 5,281,387 A | 1/1994 | Collette et al. | |
| 5,341,946 A | 8/1994 | Vailliencourt et al. | |
| 5,392,937 A | 2/1995 | Prevot et al. | |
| 5,411,699 A | 5/1995 | Collette et al. | |
| 5,472,181 A | 12/1995 | Lowell | |
| RE35,140 E | 1/1996 | Powers, Jr. | |
| 5,484,052 A | 1/1996 | Pawloski et al. | |
| 5,503,283 A | 4/1996 | Semersky | |
| 5,598,941 A | 2/1997 | Semersky et al. | |
| 5,642,826 A | 7/1997 | Melrose | |
| 5,672,730 A | 9/1997 | Cottman | |
| 5,690,244 A | 11/1997 | Darr | |
| 5,713,480 A | 2/1998 | Petre et al. | |
| 5,730,914 A | 3/1998 | Ruppmann, Sr. | |
| 5,737,827 A | 4/1998 | Kuse et al. | |
| 5,780,130 A | 7/1998 | Hansen et al. | |
| 5,785,197 A | 7/1998 | Slat | |
| 5,829,614 A | 11/1998 | Collette et al. | |
| 5,887,739 A | 3/1999 | Prevot et al. | |
| 5,888,598 A | 3/1999 | Brewster et al. | |
| 5,897,090 A | 4/1999 | Smith et al. | |
| 5,906,286 A | 5/1999 | Matsuno et al. | |
| 5,908,128 A | 6/1999 | Krishnakumar et al. | |
| D415,030 S | 10/1999 | Searle et al. | |
| 5,976,653 A | 11/1999 | Collette et al. | |
| RE36,639 E | 4/2000 | Okhai | |
| 6,065,624 A | 5/2000 | Steinke | |
| 6,213,325 B1 | 4/2001 | Cheng et al. | |
| 6,228,317 B1 | 5/2001 | Smith et al. | |
| 6,230,912 B1 | 5/2001 | Rashid | |
| 6,277,321 B1 | 8/2001 | Vailliencourt et al. | |
| 6,298,638 B1 | 10/2001 | Bettle | |
| 6,375,025 B1 | 4/2002 | Mooney | |
| 6,390,316 B1 | 5/2002 | Mooney | |
| 6,413,466 B1 | 7/2002 | Boyd et al. | |
| 6,439,413 B1 | 8/2002 | Prevot et al. | |
| 6,467,639 B2 | 10/2002 | Mooney | |
| 6,485,669 B1 | 11/2002 | Boyd et al. | |
| 6,502,369 B1 | 1/2003 | Andison et al. | |
| 6,514,451 B1 | 2/2003 | Boyd et al. | |
| 6,585,124 B2 | 7/2003 | Boyd et al. | |
| 6,595,380 B2 | 7/2003 | Silvers | |
| 6,612,451 B2 | 9/2003 | Tobias et al. | |
| 6,662,960 B2 | 12/2003 | Hong et al. | |
| 6,749,780 B2 | 6/2004 | Tobias | |
| 6,763,968 B1 | 7/2004 | Boyd et al. | |
| 6,923,334 B2 | 8/2005 | Melrose et al. | |
| 6,942,116 B2 | 9/2005 | Lisch et al. | |
| 7,051,889 B2 | 5/2006 | Boukobza | |
| 7,077,279 B2 | 7/2006 | Melrose | |
| 7,137,520 B1 | 11/2006 | Melrose | |
| 7,150,372 B2 | 12/2006 | Lisch et al. | |
| 7,159,374 B2 | 1/2007 | Abercrombie, III et al. | |
| 2001/0035391 A1 | 11/2001 | Young et al. | |
| 2002/0074336 A1 | 6/2002 | Silvers | |
| 2002/0096486 A1 | 7/2002 | Bourque | |
| 2002/0153343 A1 | 10/2002 | Tobias et al. | |
| 2003/0186006 A1 | 10/2003 | Schmidt et al. | |
| 2003/0196926 A1 | 10/2003 | Tobias et al. | |
| 2003/0217947 A1 | 11/2003 | Ishikawa et al. | |
| 2004/0149677 A1 | 8/2004 | Slat et al. | |
| 2004/0173565 A1 | 9/2004 | Semersky et al. | |
| 2006/0006133 A1 | 1/2006 | Lisch et al. | |
| 2006/0138074 A1 | 6/2006 | Melrose | |
| 2006/0231985 A1 | 10/2006 | Kelley | |
| 2006/0243698 A1 | 11/2006 | Melrose | |
| 2006/0255005 A1 | 11/2006 | Melrose et al. | |
| 2006/0261031 A1 | 11/2006 | Melrose | |
| 2007/0045312 A1 | 3/2007 | Abercrombie, III et al. | |
| 2007/0051073 A1 | 3/2007 | Kelley et al. | |
| 2007/0084821 A1 | 4/2007 | Bysick et al. | |
| 2007/0181403 A1 | 8/2007 | Sheets et al. | |
| 2007/0199915 A1 | 8/2007 | Denner et al. | |
| 2007/0199916 A1 | 8/2007 | Denner et al. | |
| 2007/0215571 A1 | 9/2007 | Trude | |
| 2007/0235905 A1 | 10/2007 | Trude et al. | |
| 2008/0047964 A1 | 2/2008 | Denner et al. | |

FOREIGN PATENT DOCUMENTS

| | | |
|---|---|---|
| CA | 2077717 A1 | 3/1993 |
| DE | P2102319.8 | 8/1972 |
| EP | 0521642 | 1/1993 |
| EP | 0 551 788 A1 | 7/1993 |
| EP | 0 609 348 B1 | 2/1997 |
| EP | 0916406 A2 | 5/1999 |
| EP | 1 063 076 A1 | 12/2000 |
| FR | 1571499 | 6/1969 |
| GB | 1 113988 | 5/1968 |
| GB | 2050919 A | 1/1981 |
| JP | 48-31050 | 9/1973 |
| JP | 49-28628 | 7/1974 |
| JP | 54-72181 A | 6/1979 |
| JP | 56-72730 U | 6/1981 |
| JP | 57-37827 U | 2/1982 |
| JP | 63-189224 A | 8/1988 |
| JP | 3-43342 A | 2/1991 |
| JP | 03-076625 A | 4/1991 |

| | | |
|---|---|---|
| JP | 5-193694 | 8/1993 |
| JP | 07-300121 A | 11/1995 |
| JP | 09-039934 A | 2/1997 |
| JP | 09039934 A | 10/1997 |
| JP | 10-167226 A | 6/1998 |
| JP | 10181734 A | 7/1998 |
| JP | 10-230919 A | 9/1998 |
| JP | 2000229615 | 8/2000 |
| JP | 2002-127237 A | 5/2002 |
| JP | 2006-501109 | 1/2006 |
| NZ | 506684 | 9/2001 |
| NZ | 512423 | 9/2001 |
| NZ | 521694 | 10/2003 |
| WO | WO 93/09031 A1 | 5/1993 |
| WO | WO 93/12975 A1 | 7/1993 |
| WO | WO 97/34808 A1 | 9/1997 |
| WO | WO 00/51895 A1 | 9/2000 |
| WO | WO 01/40081 A1 | 6/2001 |
| WO | WO 02/02418 A1 | 1/2002 |
| WO | WO 02/18213 A1 | 3/2002 |
| WO | WO 02/085755 A1 | 10/2002 |
| WO | WO 2004/028910 A1 | 4/2004 |
| WO | WO 2004/106175 | 4/2004 |
| WO | WO 2004/106176 A2 | 9/2004 |
| WO | WO 2005/012091 A2 | 2/2005 |
| WO | WO 2006/113428 A3 | 10/2006 |

OTHER PUBLICATIONS

Final Office Action, Dated Jun. 12, 2008, U.S. Appl. No. 10/851,083, filed May 24, 2004.

Office Action, Dated Sep. 6, 2007, U.S. Appl. No. 10/851,083, filed May 24, 2004.

Office Action, Dated Oct. 27, 2008, U.S. Appl. No. 10/566,294, filed Sep. 5, 2006.

Final Office Action, Dated Sep. 9, 2008, U.S. Appl. No. 10/558,284, filed Oct. 20, 2006.

Office Action, Dated Jan. 25, 2008, U.S. Appl. No. 10/558,284, filed Oct. 20, 2006.

"Application and Development of PET Plastic Bottle," Publication of Tsinghad Tongfang Optical Disc Co. Ltd., Issue 4, 2000, p. 41. (No English language translation available).

International Search Report for PCT/US2007/006318 dated Sep. 11, 2007.

CONTAINER AND METHOD FOR BLOWMOLDING A BASE IN A PARTIAL VACUUM PRESSURE REDUCTION SETUP

BACKGROUND OF THE INVENTION

1. Field of the Invention

The invention generally relates to a method for blowmolding a container, and more particularly to a method for blowmolding a container with a base having sufficient rigidity to withstand forces experienced during inversion of a base wall.

2. Related Art

One method of manufacturing containers is through a process known as stretch blowmolding. In this process, a preformed parison, or preform, is prepared from a thermoplastic material, typically by an injection molding process. The preform typically includes a threaded end, which becomes the threads of the container. During stretch blowmolding, the preform is positioned between two open blow mold halves. The blow mold halves close about the preform and cooperate to provide a cavity into which the preform is blown to form the container. Once the mold is closed, a gas is forced into the perform causing it to stretch and to take the shape of the mold as the plastic contacts the mold. After molding, the mold halves open to release the blowmolded container.

One problem with stretch blowmolding is that stretching of the plastic material may affect the performance of the container at certain areas. While the stretching of the plastic material may not cause problems for most sections of the container, it particularly affects the ability of the plastic material to form around a deep protrusion in the mold. In some applications of container manufacturing, a deep protrusion may be required at a particular section of a container, most often at a base of the container. As the plastic contacts the deep protrusion of the mold, the plastic must stretch and flow around the protrusion into a recess. However, the plastic material is less able to flow and stretch around the protrusion because of the contact friction with the mold surface. Insufficient material distribution at a region, such as at the base, may affect the ability of the region to maintain its shape around the protrusion during hot filling, the strength of the region, or the ability of the container to stand on a flat surface.

A lack of definition in the base caused by the inability of the plastic to properly form at a deep protrusion is a particular problem when one or more invertable walls are included in the base. If the invertable walls or the surrounding areas of the base are not sufficiently rigid, inversion of the walls may deform the base, which may cause problems in the ability of the container to stably stand on a flat surface and may affect the appearance of the container.

What is needed is an improved method of forming a container base that overcomes the shortcomings of conventional solutions.

BRIEF SUMMARY OF THE INVENTION

The invention includes a container, a base of the container, and a method for making the container.

A method according to exemplary embodiments of the invention may include blowmolding a container, a base of the container having a first hinge, a first wall coupled to the first hinge, a second hinge coupled to the first wall, and a second wall coupled to the second hinge, both of the first wall and the second wall being formed extending away from an interior of the container relative to a longitudinal axis of the container, inverting the first wall about the first hinge toward the interior of the container relative to the longitudinal axis, and inverting the second wall about the second hinge toward the interior of the container relative to the longitudinal axis, wherein rigidity of the base prevents substantial net distortion of the base during inversion of the second wall.

A base of a container according to exemplary embodiments of the invention may include a standing surface, a first wall, a second wall, a first hinge positioned between the standing surface and the first wall, the first wall being rotateable about the first hinge relative to a longitudinal axis of the container, and a second hinge positioned between the first wall and the second wall, the second wall being rotateable about the second hinge relative to the longitudinal axis of the container, wherein rigidity of the base prevents substantial net distortion of the base during rotation of the second wall.

A container having a longitudinal axis according to exemplary embodiments of the invention may include an upper portion having an opening into an interior of the container, a neck portion connected to the upper portion, a body connected to the neck portion, and a base connected to the body. The base may include a standing surface, a first wall, a second wall, the first wall and the second wall extending away from the interior of the container relative to the longitudinal axis, a first hinge positioned between the standing surface and the first wall, the first wall being rotateable about the first hinge toward the interior of the container relative to the longitudinal axis, and a second hinge positioned between the first wall and the second wall, the second wall being rotateable about the second hinge toward the interior of the container relative to the longitudinal axis, wherein rigidity of the base prevents substantial net distortion of the base during inversion of the second wall.

Further advantages, as well as the structure and function of exemplary embodiments will become apparent from a consideration of the description, drawings, and examples.

BRIEF DESCRIPTION OF THE DRAWINGS

The foregoing and other features and advantages of the invention will be apparent from the following, more particular description of exemplary embodiments of the invention, as illustrated in the accompanying drawings, wherein like reference numbers may generally indicate identical, functionally similar, and/or structurally similar elements.

Further objectives and advantages, as well as the structure and function of exemplary embodiments will become apparent from a consideration of the description, drawings, and examples.

DETAILED DESCRIPTION OF THE INVENTION

Exemplary embodiments of the invention are discussed in detail below. In describing the exemplary embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations may be used without parting from the spirit and scope of the invention. All references cited herein are incorporated by reference as if each had been individually incorporated.

Exemplary embodiments of the present invention may generally relate to a container, a method of manufacturing a container, and a base of a container to account for the rigidity and vacuum pressure requirements experienced by a container during hot-fill processing. In an exemplary embodiment, the base of the container may include multiple invertable walls and hinges. Inversion of the invertable walls may be used to partially alleviate vacuum pressure experienced by the container during hot-fill processing. Initially, the invertable walls may be formed in a container mold protruding away from an interior of the container. The mold for the container, according to an exemplary embodiment of the present invention, eliminates the majority of deep protrusions in the mold and replaces the deep protrusions with one or more cavities that form the invertable walls. Having a cavity in the mold, instead of a deep protrusion, allows plastic to flow into the cavity to better form all mold surfaces in the base region, thereby increasing the orientation of the plastic at the cavity. By stretching the plastic into the cavity, the potential for base sagging during a hot-fill process may be reduced. After being blow molded protruding away from the interior of the container, the invertable walls may be rotated about the hinges in the base in one or more stages to form the final shape of the container.

Figure 1A:
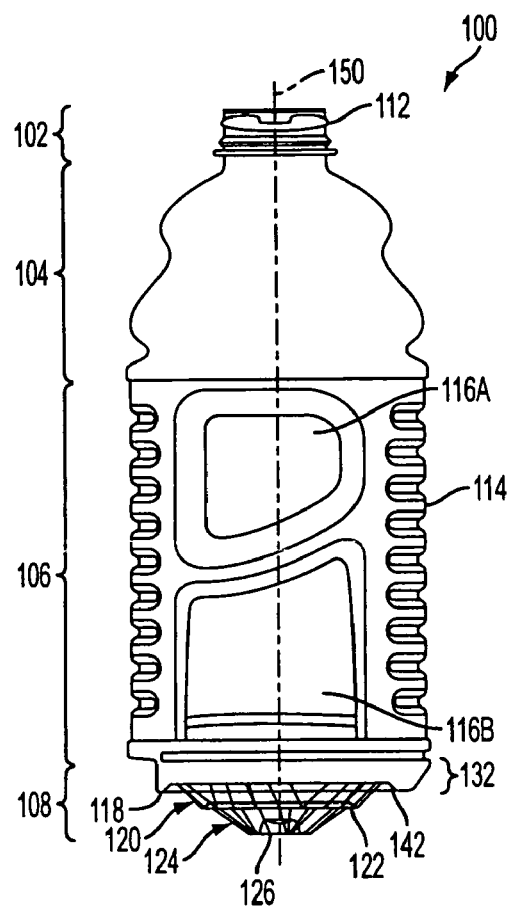
FIG. 1A depicts an exemplary embodiment of a first stage of forming a container base, according to the present invention.
Figure 1B:
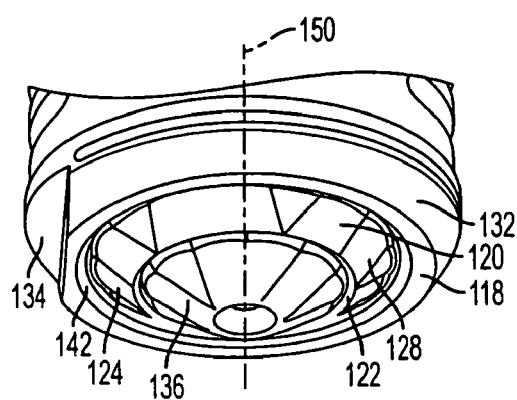
FIG. 1B depicts a perspective view of an exemplary base of the container in FIG. 1A, according to the present invention.
Figure 2A:
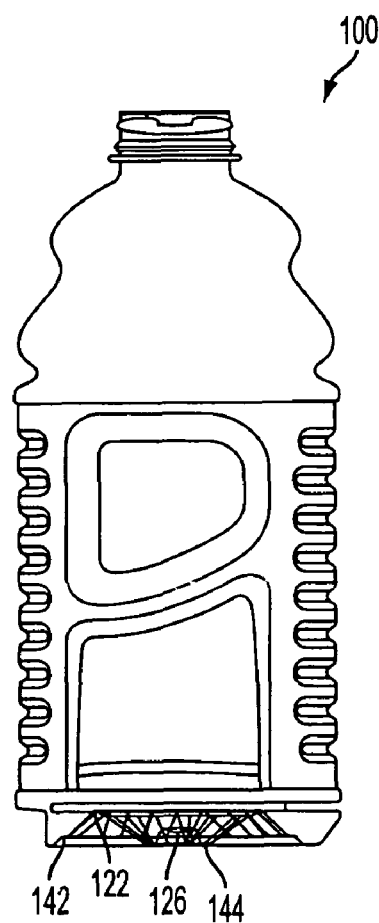
FIG. 2A depicts an exemplary second stage of forming a container base, according to the present invention.
Figure 2B:
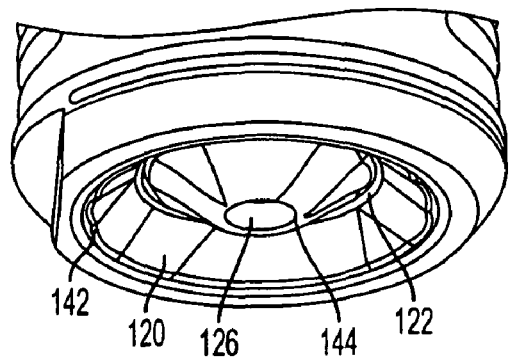
FIG. 2B depicts a perspective view of an exemplary base of the container in FIG. 2A, according to the present invention.
Figure 3A:
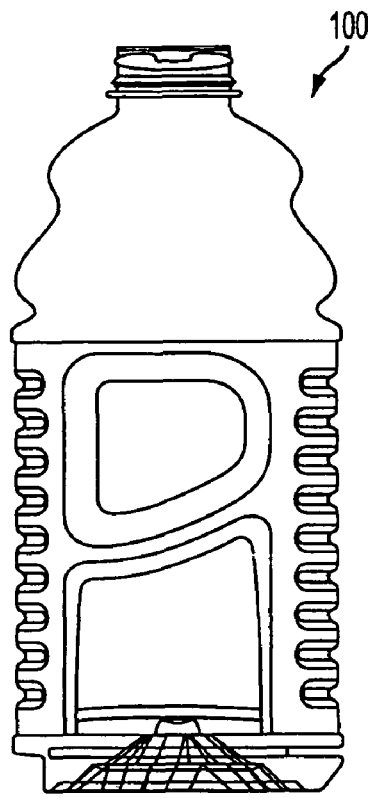
FIG. 3A depicts an exemplary embodiment of a third stage of forming a container base, according to the present invention.
Figure 3B:
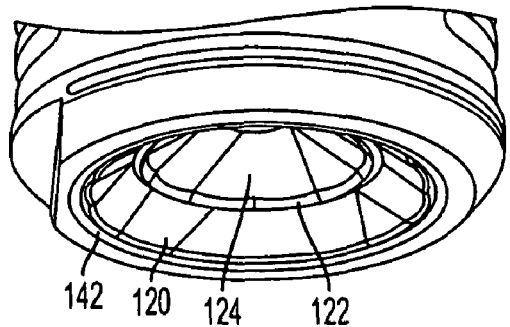
FIG. 3B depicts a perspective view of an exemplary base of the container in FIG. 3A, according to the present invention.
Figure 4:
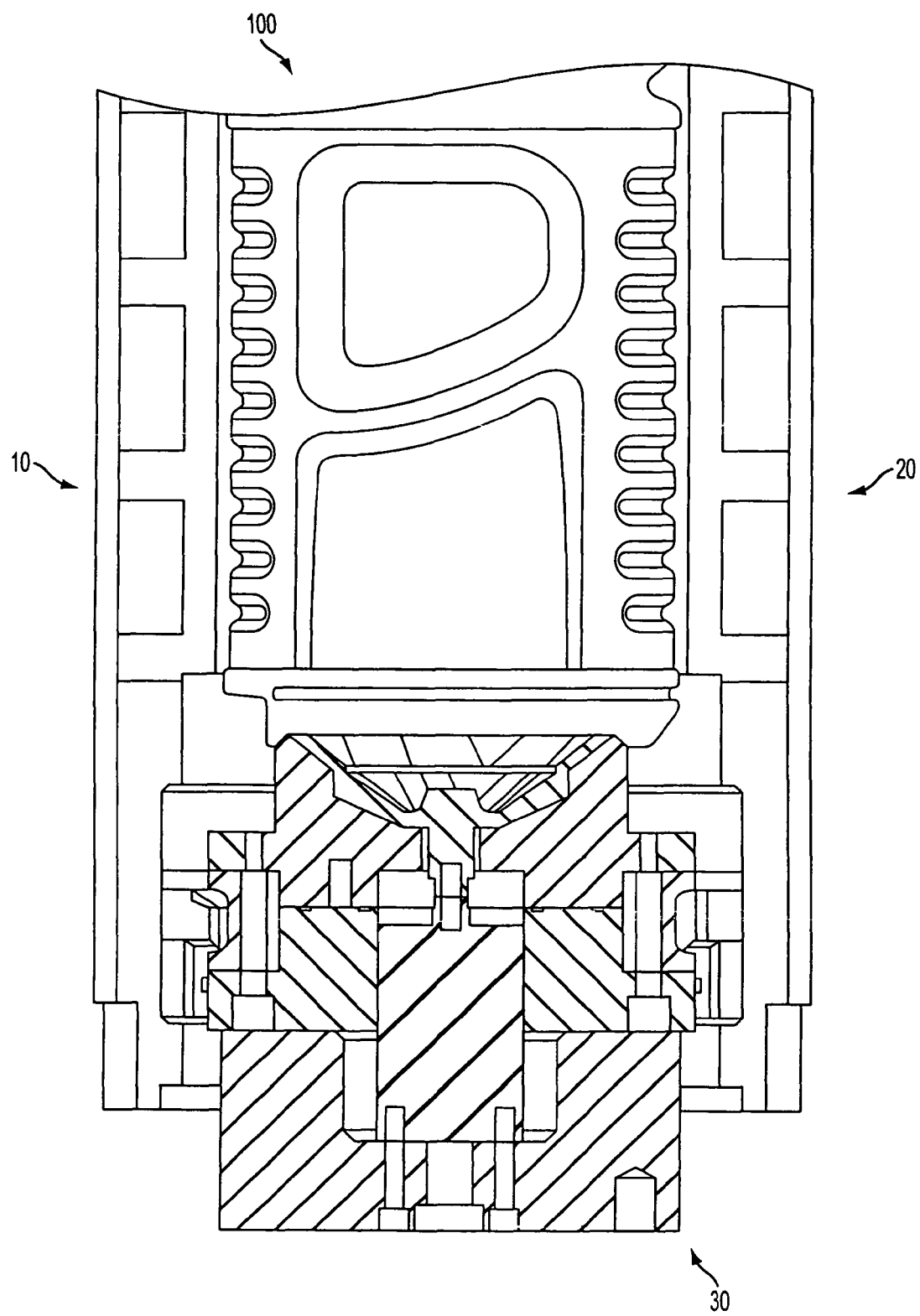
FIG. 4 is an enlarged illustration of an exemplary mold for forming the container base.

FIGS. 1A-B illustrate an exemplary embodiment of a first stage of a container representing the shape of the container as stretch blowmolded according to the present invention. FIGS. 2A-B illustrate an exemplary embodiment of a second stage of a container after inversion of a first wall according to the present invention. FIGS. 3A-B illustrate an exemplary embodiment of a third stage of a container after inversion of the second wall to partially alleviate vacuum pressure experienced during hot-fill processing of the container according to the present invention. FIG. 4 illustrates a mold for forming an exemplary container according to the invention. The mold has a left side 10, a right side 20 and a base 30 that can be brought together around a preform to create the mold or separated to release the formed container.

The exemplary embodiments will initially be discussed with reference to FIGS. 1A-B. According to an exemplary embodiment of the present invention, container 100 is blow-molded into the shape as illustrated in FIGS. 1A-B. FIG. 1A illustrates a side view of the exemplary container 100 and FIG. 1B illustrates a perspective view of a base of the exemplary container 100 according to an exemplary embodiment of the present invention. As depicted, the container 100 includes an upper portion 102, a shoulder 104, a container body 106, and a base 108. The upper portion 102 of the container 100 generally is any structure having an opening into the interior of the container 100 and being adapted to receive a closure (not shown). The closure may be any device used to create a substantially air tight seal for a hot-filled product within the container 100, thus substantially preventing air from entering the container 100 through the upper portion 102. In one exemplary embodiment, the upper portion 102 includes threads 112 that are adapted to couple with a closure that is a twist-on cap. The cap may be twisted onto the threads 112 of the upper portion 102 to create a seal with the container 100. In an alternative embodiment, a sealing plug may be placed in the upper portion 102 to seal the container 100. Other closures or seals may be used, as will be appreciated by those of skill in the art.

The shoulder 104 of the container 100 extends from the top of the container body 106 to the bottom of the upper portion 102. Generally, the shoulder 104 narrows as it progresses from the container body 106 to the bottom of the upper portion 102. The shoulder 104 may have any desired shape, or may be omitted from the container 100. The shoulder 104 may include patterns, shapes, and other geometries, or alternatively, may be substantially smooth. In the depicted embodiment, the width of the bottom of the shoulder 104 corresponds to the width of the top of the container body 106, and narrows by curving inward as the shoulder 104 approaches the upper portion 102. The shoulder 104 curves outward before reaching the upper portion 102, and then curves inward as the shoulder 104 reaches the upper portion 102. The shoulder 104 may be other shapes and include other patterns, as will be appreciated by those of skill in the art.

The container body 106 of the container 100 extends from the base 108 to the shoulder 104 and defines an interior of the container 100. The container body 106 is positioned below the shoulder 104. In an alternative embodiment, if the shoulder 104 is omitted from the container 100, the container body 106 extends to the upper portion 102. The container body 106 may be any asymmetrical or symmetrical shape, such as, but not limited to, cylindrical, square, rectangular, or other geometries. Optionally, the container body 106 of the container 100 may include patterned support structure or vacuum panels. The patterned support structure and the vacuum panels may help provide structural integrity for the container 100.

In the depicted embodiment, the container body 106 is cylindrically shaped and has ribs 114 and multiple vacuum panels 116A-B. The ribs 114 may be a series of recessed sections alternating with non-recessed sections on the container body 106. The vacuum panel 116A may be configured to form a hand grip region, and the vacuum panel 116B may be substantially flat recessed sections having a much larger recessed area than that of the ribs 114. Alternatively, vacuum panel 116B may include a hand grip, and the vacuum panel 116A may be a substantially flat recessed section. Other vacuum panel designs and/or combinations are known in the art. A container according to the invention may also include different types of vacuum panels. The ribs 114 may include other types and shapes and both the ribs 114 and the vacuum panels 116A-B may be placed at alternate locations on the container body 106, as will be appreciated by those of skill in the art. The ribs 114 and the vacuum panels 116A-B may also be omitted from the container body 106, or may be placed at other locations on the container 100.

The base 108 may include a convex annular wall 132, a standing surface 118, a first hinge 142, a first wall 120, a second hinge 122, a second wall 124, a third hinge 144, and a section 126. The standing surface 118 is the contact surface of the container 100 that may contact a flat surface when the base 108 is in the third stage, discussed below, and placed upright on the flat surface. The container 100 is upright on the flat surface when a substantial portion of the standing surface 118 contacts the flat surface and the flat surface is underneath the container 100. The standing surface 118 may be formed in other asymmetrical or symmetrical geometries, as will be appreciated by those of skill in the art. The standing surface 118 is positioned between the convex annular wall 132 and the first hinge 142. The convex annular wall 132 is adjacent to the body 106 of the container 100. The convex annular wall 132 may extend all of the way around the standing surface 118, or alternatively, may include a notch 134, such as a label lug. As is known in the art, a label lug may be used to orient the container 100 for applying a label at a desired location on the container 100.

Initially, when the container 100 is stretch blowmolded, the first wall 120 and the second wall 124 are formed extending away from the interior of the container 100 along a longitudinal axis 150 of the container 100. The first wall 120 of the container 100 is located between the first hinge 142 and the second hinge 122. In the depicted embodiment, the first wall 120 is generally the shape of an outer wall of a truncated cone and is concentric with the longitudinal axis 150. The first wall 120 may be frustoconical in shape. However, the first wall 120 may be other symmetric or asymmetric shapes, as will be appreciated by those skilled in the art. Similarly, the first hinge 142 is concentric with the longitudinal axis 150 and may also be formed into other asymmetric or symmetric shapes. The first wall 120 slopes in a direction from the first hinge 142 to the second hinge 122 away from the interior of the container 100. The slope of the first wall 120 may be curved or linear, or a combination of curved and linear sections. The first wall 120 may include creases 128 that are adapted to flex to allow the first wall 120 to rotate about the first hinge 142. Alternatively, if the angle between first wall 120 and a horizontal plane in which the standing surface 118 lies is sufficiently shallow, the first wall 120 may not require any creases, as described in U.S. Pat. No. 6,942,116, issued Sep. 13, 2005, the contents of which are incorporated herein by reference in their entirety.

The first hinge 142 is formed between the standing surface 118 and the first wall 120. The first hinge 142 is formed in the plastic so that when an upward, axial force is applied to second wall 124, the first hinge 142 substantially retains its initial shape without creasing or deforming, thus allowing the first wall 120 to rotate about the first hinge 142. The first hinge 142 is depicted as a circular ring that is offset from the standing surface 118. However, the first hinge 142 may be other symmetrical or asymmetrical shapes, as will be appreciated by those of skill in the art.

The second hinge 122 is located at the intersection of the first wall 120 and the second wall 124. The second hinge 122 is depicted as a circular ring that is offset from the standing surface 118. However, the second hinge 122 may be other symmetrical or asymmetrical shapes, as will be appreciated by those of skill in the art. The second hinge 122 is formed in the plastic so that when an upward, axial force is applied to the second wall 124, the second hinge 122 substantially retains its initial shape without creasing or deforming, thus allowing the second wall 124 to rotate about the second hinge 122. In one embodiment, the angle of the first wall 120 and the second wall 124 relative to a horizontal plane in which the standing surface 118 lies may be approximately 25°-50°.

The second wall 124 is positioned between the second hinge 122 and the third hinge 144. The second wall 124 is rotateable about the second hinge 122. As depicted, the second wall 124 is the shape of the outer wall of a truncated cone and is concentric with the longitudinal axis 150. The second wall 124 may be a frustoconical shape. Other shapes may be used for the second wall 124 and the second hinge 122, as will be appreciated by those of skill in the art. As initially blowmolded, the second wall 124 slopes in a substantially linear direction away from the second hinge 122 toward the third hinge 144. This direction of the slope is substantially away from the interior of the container 100 relative to the longitudinal axis 150. The initial direction of the slope of the second wall 124 may be the same direction as the initial direction of the slope of the first wall 120, as depicted in FIGS. 1A-B. However, the initial directions of the slopes for the first wall 120 and the second wall 124 may differ, as will be appreciated by those skilled in the art. The second wall 124 in the illustrated embodiment also includes creases 136 that facilitate rotation of the second wall 124 about the second hinge 122. The creases 136 are adapted to flex during repositioning of the second wall 124 to facilitate rotation about the second hinge 122.

The third hinge 144 is located at the intersection of the second wall 124 and the section 126. The section 126 is rotateable about the third hinge 144 during rotation of the second wall 124 about the second hinge 122. The third hinge 144 is depicted as a circular ring that is offset from the standing surface 118. However, the third hinge 144 may be other symmetrical or asymmetrical shapes, as will be appreciated by those of skill in the art.

The section 126 is centrally located within the second wall 124, and may be concave, convex, or flat relative to the interior of the container 100. The section 126 is adapted to receive a mechanical device that repositions the second wall 124 about the second hinge 122. The mechanical device may apply a force on the section 126 to reposition the second wall 124. Alternatively, an air or pneumatic cylinder (not shown) may be used to apply forced air for inverting the second wall 124. Other types of forces may be used on the base 108 to invert the second wall 124, as will be appreciated by those skilled in the art.

The container 100 is blowmolded into the shape depicted in FIGS. 1A-B to increase the rigidity of the base 108. The container 100 is formed into this shape to ensure that all regions of the base 108 are properly formed and have sufficient definition. An advantage of forming the container 100 in the first stage is that the rigidity of the base 108 is increased by allowing for further orientation of plastic material at the base 108 (see FIGS. 1A-B), as compared with initially forming the container into the shape illustrated in the second stage (see FIGS. 2A-B). By having the first wall 120 and the second wall 124 extend away from the interior of the container 100 along the longitudinal axis 150, the orientation of plastic material in the base 108 is increased since it allows the plastic material to further stretch into a cavity of a mold for the base 108 during blowmolding. As the orientation of the plastic molecules increases, the molecules straighten and may form a crystalline structure. Typically, the higher the crystallinity of the plastic, the greater the rigidity of the plastic, which improves the structural integrity of the container 100 at the base 108. The structural integrity of the base 108 is important in allowing the container 100 to withstand the rigors of hot-fill processing. A similar process for increasing orientation is also described in co-pending U.S. Provisional Utility Patent Application No. 60/671,459, filed Apr. 15, 2005, the contents of which are incorporated herein by reference in their entirety.

It is noted that if the container 100 would be initially blowmolded into the shape depicted in FIGS. 2A-B, (i.e., skipping the first stage) the base 108 would not be fully formed at the region near the standing surface 118 and at the region near the third hinge 144. If the base 108 is not fully formed at the standing surface 118, this may create an uneven or warped standing surface 118 that may cause the container 100 to rock when placed upright on a flat surface. The reason the base 108 would not be fully form is the manner in which containers are formed during stretch blowmolding. As a container is being stretch blowmolded, gas stretches plastic material against a mold for the container, such as a mold for the container 100. If the mold contains a protrusion to form the base 108 depicted in FIGS. 2A-B, the plastic material would have to stretch around the protrusion from the second hinge 122 down to the standing surface 118 and to the third hinge 144 (see FIGS. 2A-B). The contact with the mold would trap material at the region near the second hinge 122, and not allow the material to fully form down into the region near the standing surface 118, the first hinge 142, and the third hinge 144.

Forming the container 100 into the shape as illustrated in the first stage also reduces the wall thickness of the base 108 and reduces the occurrence of thick amorphous plastic sections in the base 108, as compared with skipping the first stage. This may allow the amount of plastic material present in the base 108 to be reduced without detrimentally affecting container performance, and, in some instances, this technique improves the performance of the base 108. Likewise, forming the container in the first stage may allow a more uniform distribution of plastic material in the base 108. Moreover, the increased rigidity of the base 108 allows for the inversion of the first wall 120 and the second wall 124 without a substantial net distortion of the base 108. Thus, forming the container 100 as described in the first stage allows the base 108 to maintain its appearance and to stably stand on a flat surface after both inversions of the first wall 120 and the second wall 124.

Once the container is blowmolded into the shape of the first stage illustrated in FIGS. 1A-B, the first wall 120 may be inverted about the first hinge 142 into the shape depicted in the second stage, as illustrated in FIGS. 2A-B. FIG. 2A depicts a side view of an exemplary container in the second stage and FIG. 2B depicts a perspective view of a base of the exemplary container according to the present invention. During inversion, a force may be applied to the second wall 124 and to the section 126 while the container 100 remains within the mold (not shown). In one embodiment, the inversion of the first wall 120 may occur as late into the blowing process as possible so that the container 100 is allowed to cool as much possible before ejection of the container 100 from the mold, because the warmer the container is during inversion, the higher the probability that the container will crease at an undesired location. The inversion may occur just before ejection to reduce the likelihood that the inversion will form unwanted creases or deformities in the container 100. An air cylinder (not shown) may be used for the inversion of the first wall 120 by applying a force to the second wall 124 and to section 126. Alternatively, other mechanical means for inverting may be used, as will be appreciated by those skilled in the art. During inversion, the creases 128 in the first wall 120 flex to facilitate the inversion and to prevent distortion of the base 108. The first wall 120 rotates about the first hinge 142 during inversion of the from the first stage to the second stage. The first wall 120 also rotates about the second hinge 122 relative to the second wall 124 during inversion from the first stage to the second stage. After inversion of the first wall 120, the first wall 120 slopes in a direction toward the interior of the container 100 relative to the longitudinal axis 150, and the second wall 124 slopes in a direction away from the interior of the container 100 relative to the longitudinal axis 150, as illustrated in FIGS. 2A-B.

The second stage is the stage in which the container 100 may be hot-filled with a product. The structure of the base 108 in the second stage may be used to partially reduce an internal vacuum pressure experienced by the container 100 experienced during hot-fill processing. After the container 100 is hot-filled with a product and sealed with a closure, such as, but not limited to, a cap, the product begins to cool within the container 100. Cooling of the product creates an internal vacuum pressure within the container 100 due to a reduction in product volume caused by the cooling and contraction of the product. The internal vacuum pressure within the container 100 tends to cause the container 100 to collapse inwardly. To overcome a portion of the internal vacuum pressure within the container 100, the second wall 124 may be repositioned about the second hinge 122. During this repositioning, the creases 136 of the second wall 124 may flex to facilitate the repositioning and to prevent substantial net distortion of the base 108. The second wall 124 also rotates about the third hinge 144 relative to the section 126 during inversion. This repositioning of the second wall 124 corresponds to a change in position from the second stage (see FIGS. 2A-B) to the third stage (see FIGS. 3A-B). Alternatively, both the first wall 120 and the second wall 124 may be inverted prior to hot-filling.

During inversion of the second wall 124, a force may be applied to section 126 to invert the second wall 124 about the second hinge 122. This inversion also causes the section 126 to rotate about the third hinge 144. The force may be applied to the section 126 by an air or pneumatic cylinder, a cam actuated rod, or other machines. As the machine increases the force at the section 126, the section 126 inverts about the third hinge 144 and the second wall 124 inverts about the second hinge 142 relative to the longitudinal axis 150. After inversion, both the first wall 120 and the second wall 124 slope in a direction toward the interior of the container 100 relative to the longitudinal axis 150. The rigidity of the base 108, particularly at the region near the standing surface 118 and the convex annular wall 132, prevent crushing or deformation of the base 108 during inversion of the first wall 120. Analogously, the rigidity of the base 108, particularly at the region near the first wall 120, the standing surface 118, and the convex annular wall 132, prevent crushing or deformation of the base 108 during inversion of the second wall 124. The rigidity of base 108 permits the first wall 120 and the second wall 124 to substantially maintain their shape after both inversions, such that no substantial net distortion of the first wall 120, the second wall 124, the section 126, or any other portion of the base 108 occurs.

FIG. 3A illustrates a side view of an exemplary container in the third stage and FIG. 3B illustrates a perspective view of a base of the exemplary container according to the present invention. FIGS. 3A-B depict the second wall 124 after repositioning from the second stage to the third stage. During repositioning, the second wall 124 is moved from a position extending outward from the container 100 to a position extending inward into the interior of the container 100 relative to the longitudinal axis 150. Repositioning causes the second wall 124 to rotate about the second hinge 122 and causes the second wall 124 to rotate about the third hinge 144 relative to the section 126. Inwardly repositioning the second wall 124 reduces the amount of volume within the interior of the container 100. This reduction in volume partially reduces the internal vacuum pressure within the container 100 caused by the volumetric shrinkage of the cooling product. The amount of volume reduced during inversion of the second wall 124 relates to the volume of the region within the base 108 of the container 100 bounded by the second wall 124 and the section 126. The volume reduced relates to the difference of internal volume between the container 100 shown in FIGS. 2A-B with the second wall 124 extending away from the interior of the container 100, and the container 100 shown in FIGS. 3A-B with the second wall 124 extending inward toward into the interior of the container 100. Pressure reduction through inversion of a base wall is also discussed in co-pending U.S. Non-Provisional Utility patent application Ser. No. 11/249,342, entitled "A Repositionable Base Structure of a Container," filed Oct. 14, 2005 the contents of which are incorporated herein by reference in their entirety.

Thus, the container 100 according to an exemplary embodiment of the present invention may alleviate a portion of the vacuum pressure caused by hot-fill processing and have sufficient rigidity in the base 108 thereby allowing the container 100 to stand stably on a flat surface and allowing no substantial net distortion or deformation of the container 100 by the repositioning of the first wall 120 and the second wall 124.

The embodiments and examples discussed herein are non-limiting examples.

The exemplary embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described exemplary embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method comprising:
    blow molding a container, a base of the container having a first hinge, a first wall coupled to said first hinge, a second hinge directly coupled to said first wall, and a second wall coupled to said second hinge, both of said first wall and said second wall being formed extending away from an interior of said container relative to a longitudinal axis of said container;
    inverting said first wall about said first hinge toward the interior of said container relative to the longitudinal axis; and
    after said inverting said first wall, inverting said second wall about said second hinge toward the interior of said container relative to the longitudinal axis,
    wherein rigidity of said base prevents substantial net distortion of said base during inversion of said second wall, and
    wherein said inverting said first wall is performed prior to filling the container.

2. The method of claim 1, wherein an air cylinder or a mechanical device inverts said first wall about said first hinge.

3. The method of claim 1, wherein an air cylinder or a mechanical device inverts said second wall about said second hinge.

4. The method of claim 1, wherein said inverting said first wall results in said first hinge, said first wall, said second hinge, and said second wall being at or above a standing surface of the container.

5. The method of claim 1, further comprising:
    hot-filling, capping, and cooling the container after said inverting said first wall and before said inverting said second wall, wherein said inverting said second wall alleviates a vacuum in the container.

6. The method of claim 5, where the vacuum is partially alleviated.

7. The method of claim 1, wherein the container has a sidewall with one or more vacuum panels.

8. The method of claim 1, wherein said inverting said second wall about said second hinge occurs prior to hot-filling.

9. The method of claim 1, wherein, as a result of said inverting said first wall about said first hinge, a portion of said second wall is at a standing surface of the container.

10. A method comprising:
    blow molding a container in a first stage, a base of the container having a first hinge, a first wall coupled to said first hinge, a second hinge directly coupled to said first wall, and a second wall coupled to said second hinge, both of said first wall and said second wall being formed extending away from an interior of said container relative to a longitudinal axis of said container;
    inverting, in a second stage, said first wall about said first hinge toward the interior of said container relative to the longitudinal axis; and
    after said inverting in said second stage, inverting, in a third stage, said second wall about said second hinge toward the interior of said container relative to the longitudinal axis, wherein rigidity of said base prevents substantial net distortion of said base during inversion of said second wall,
    wherein said second stage is performed prior to hot-filling the container, and
    wherein said third stage is performed after hot-filling, capping, and cooling the container.

11. The method of claim 10, wherein said base further comprises:
    a third hinge coupled to said second wall; and
    a section coupled to said third hinge, wherein said section rotates about said third hinge during inversion of said second wall during said third stage.

12. The method of claim 10, wherein, at the end of said second stage, said first hinge, said first wall, said second hinge, and said second wall are at or above a standing surface of the container.

13. The method of claim 10, wherein said inverting said second wall reduces a vacuum in the container.

14. The method of claim 13, where the vacuum is partially reduced.

15. The method of claim 10, wherein the container has a sidewall with one or more vacuum panels.

16. The method of claim 10, wherein the container has a sidewall free of vacuum panels or other support structure.

17. The method of claim 10, wherein, as a result of said inverting said first wall about said first hinge, a portion of said second wall is at a standing surface of the container.

18. A method comprising:
    blow molding a container, a base of the container having a first hinge, a first wall coupled to said first hinge, a second hinge coupled to said first wall, and a second wall coupled to said second hinge, both of said first wall and said second wall being formed extending away from an interior of said container relative to a longitudinal axis of said container;
    inverting said first wall about said first hinge toward the interior of said container relative to the longitudinal axis; and
    inverting said second wall about said second hinge toward the interior of said container relative to the longitudinal axis, wherein rigidity of said base prevents substantial net distortion of said base during inversion of said second wall,
wherein said base further comprises:
a third hinge coupled to said second wall; and
a section coupled to said third hinge, wherein said section rotates about said third hinge during inversion of said second wall.

* * * * *